US010223276B2

(12) United States Patent
Tsirkin

(10) Patent No.: US 10,223,276 B2
(45) Date of Patent: Mar. 5, 2019

(54) PAGE CACHE MANAGEMENT DURING MIGRATION USING A LIST OF OUTSTANDING STORE REQUESTS TRANSMITTED TO A DESTINATION HOST MACHINE

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/441,165

(22) Filed: Feb. 23, 2017

(65) Prior Publication Data

US 2018/0239707 A1 Aug. 23, 2018

(51) Int. Cl.
*G06F 12/0875* (2016.01)
*G06F 3/06* (2006.01)
(Continued)

(52) U.S. Cl.
CPC ........ *G06F 12/0875* (2013.01); *G06F 3/0604* (2013.01); *G06F 3/067* (2013.01);
(Continued)

(58) Field of Classification Search
CPC .. G06F 12/0875; G06F 3/0604; G06F 3/0647; G06F 3/067; G06F 9/30043;
(Continued)

(56) References Cited

U.S. PATENT DOCUMENTS 8,055,622 B1 11/2011 Botes et al.
8,370,832 B2 2/2013 White
(Continued)

OTHER PUBLICATIONS

Clark, Christopher, et al., "Live Migration of Virtual Machines", https://pdfs.semanticscholar.org/2f2c/dd7b0c98b5e43b61272d2ac3ebb5cd29041d.pdf, 14 pages.
(Continued)

*Primary Examiner* — Glenn Gossage
(74) *Attorney, Agent, or Firm* — Lowenstein Sandler LLP

(57) ABSTRACT

Systems and methods for page cache management during migration are disclosed. A method may include initiating, by a processing device of a source host machine, a migration process for migration of a virtualized component from the source host machine to a destination host machine. The method may also include obtaining a list of outstanding store requests corresponding to the virtualized component, the outstanding store requests maintained in a page cache of the source host machine and transmitting the list to the destination host machine. The method may further include providing instructions to cancel the outstanding store requests in the page cache, and providing instructions to clear remaining entries associated with the virtualized component in the page cache. The virtualized component may include a virtual machine or a container, and the outstanding store requests may correspond to requests for non-shared resources, such as a memory page. A request for the list may be generated by a user space component of an operating system (OS) of the source host machine, and transmitted to a kernel space component of a virtualization engine of the processing device.

18 Claims, 6 Drawing Sheets

(51) Int. Cl.
*G06F 9/30* (2018.01)
*G06F 9/48* (2006.01)
*G06F 9/455* (2018.01)

(52) U.S. Cl.
CPC ........ *G06F 3/0647* (2013.01); *G06F 9/30043* (2013.01); *G06F 9/30047* (2013.01); *G06F 9/45558* (2013.01); *G06F 9/4856* (2013.01); *G06F 2009/4557* (2013.01); *G06F 2212/452* (2013.01); *G06F 2212/60* (2013.01)

(58) Field of Classification Search
CPC ............. G06F 9/30047; G06F 9/45558; G06F 9/4856; G06F 2009/4557; G06F 2212/452; G06F 2212/60
See application file for complete search history.

(56) References Cited

U.S. PATENT DOCUMENTS

| | | |
|---|---|---|
| 8,370,837 B2 | 2/2013 | Emelianov et al. |
| 9,201,676 B2 | 12/2015 | Tsirkin et al. |
| 9,355,119 B2 | 5/2016 | Curley et al. |
| 9,361,145 B1 | 6/2016 | Wilson et al. |
| 2004/0250021 A1* | 12/2004 | Honda ................. G06F 3/0605 711/114 |
| 2013/0227559 A1* | 8/2013 | Tsirkin ................. G06F 9/45558 718/1 |
| 2014/0181397 A1* | 6/2014 | Bonzini ................. G06F 12/16 711/112 |
| 2014/0215459 A1* | 7/2014 | Tsirkin ................. G06F 9/45558 718/1 |
| 2015/0229717 A1* | 8/2015 | Gupta ................... H04L 67/34 718/1 |
| 2015/0324236 A1 | 11/2015 | Gopalan et al. |
| 2016/0197986 A1* | 7/2016 | Chambliss .......... G06F 9/45558 709/213 |

OTHER PUBLICATIONS

Yang, Yaowei, "In Place Migration by Using Pre-Virtualization", https://os.itec.kit.edu/downloads/sa_2006_yang-yaowei_in-place-migration.pdf, Mar. 20, 2006, 38 pages.

Hongyang, Yang, "Re: [Qemu-devel] [Patch v7 01/42] Start Documenting how Postcopy Works", https://lists.gnu.org/archive/html/qemu-devel/2015-06/msg06819.html, Jun. 26, 2015, 5 pages.

* cited by examiner

US 10,223,276 B2

PAGE CACHE MANAGEMENT DURING MIGRATION USING A LIST OF OUTSTANDING STORE REQUESTS TRANSMITTED TO A DESTINATION HOST MACHINE

TECHNICAL FIELD

The disclosure is generally related to computing devices, and is more specifically related to page cache management during migration.

BACKGROUND

Virtualization is a computing technique that improves system utilization, decoupling applications from the underlying hardware, and enhancing workload mobility and protection. One approach to virtualization is implementation of virtual machines (VMs). Another approach to virtualization is implementation of containers. The difference between a VM versus a container is primarily in the location of the virtualization layer and the way that operating system resources are used.

A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

Containers are a form of operating system virtualization that encapsulates an application's code, configuration, and dependencies into building blocks that can be easily deployed. Containers allow for the execution of the application and its dependencies in resource-isolated processes (e.g., isolated user-space instances of the operating system). Containers provide for environmental consistency, operational efficiency, developer productivity, and version control. Containers further allow for applications to be deployed quickly, reliably, and consistently regardless of the deployment environment.

BRIEF DESCRIPTION OF THE DRAWINGS

The disclosure is illustrated by way of example, and not by way of limitation, and may be more fully understood with reference to the following detailed description when considered in connection with the figures, in which.

DETAILED DESCRIPTION

Figure 1:
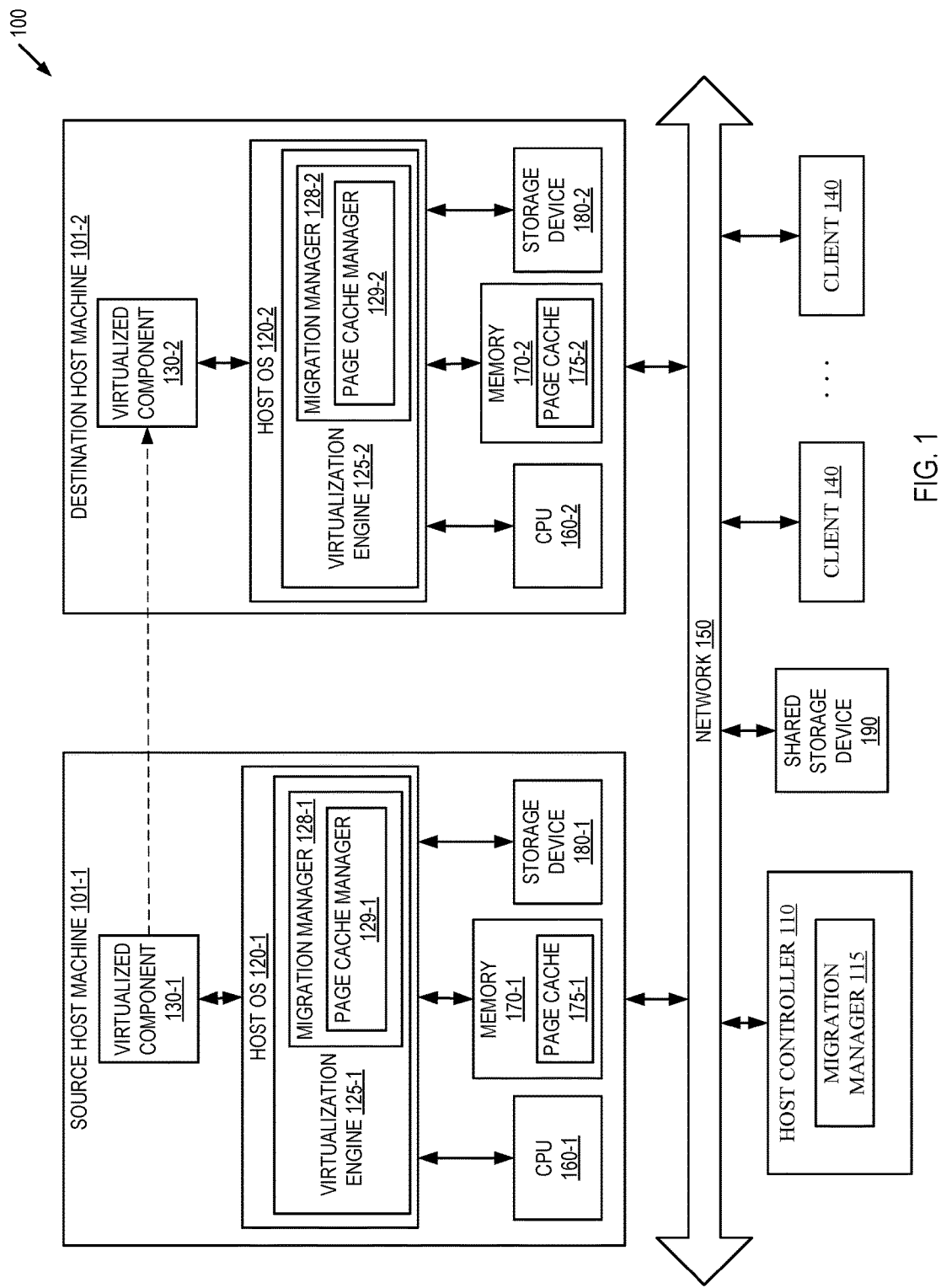
FIG. 1 depicts a high-level diagram of an example distributed computing system in accordance with one or more aspects of the disclosure.

Described herein are methods and systems for page cache management during migration. Migration refers to the process of stopping execution of a virtualized component at a first computing device (e.g., source host machine), transferring the state of the virtualized component to a second computing device (e.g., destination host machine), and resuming execution of the virtualized component at the second computing device. A virtualized component may include, but is not limited to, a virtual machine (VM) or a container.

A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

Containers are a form of operating system virtualization that encapsulates an application's code, configuration, and dependencies into building blocks that can be easily deployed. Containers allow for the execution of the application and its dependencies in resource-isolated processes (e.g., isolated user-space instances of the operating system). Containers provide for environmental consistency, operational efficiency, developer productivity, and version control. Containers further allow for applications to be deployed quickly, reliably, and consistently regardless of the deployment environment.

The isolated nature of a virtualized component makes it easy to move between environments (e.g., development, test, production, etc.), while retaining full functionality. For example, an application can be migrated from one host machine to another host machine by migrating the VM that deploys the application or by migrating the containers that deploy the functionality of the application. Migration of a virtualized component involves saving the state of the virtualized component on a source host machine and restoring it on a destination host machine.

A portion of a virtualized component's state is storage (i.e., data that the virtualized component stores to disk). This data may be located in a page cache in memory of the source host machine. As part of the migration process provided by conventional systems, the page cache data is flushed (i.e., stored) to a storage device (e.g., disk) shared with the destination host machine. The page cache data could then be read back at the destination host machine post-migration process. In the absence of this flush, the source host machine could crash and take down the virtualized component. However, the flush operation can take a long time (e.g., seconds) in some cases (e.g., due to slow networked storage). This increases application downtime and negatively impacts the user experience.

Implementations of the disclosure provide for page cache management during migration. During a migration process, implementations of the disclosure obtain a list of outstanding store requests (also referred to as write requests) for a virtualized component that is being migrated. This list is obtained from the page cache in the source host machine hosting the virtualized component. The outstanding store requests may also be referred to as dirty page cache entries. The list, and data (e.g., content of pages) associated with the outstanding store requests, are provided to the destination host machine in order for the destination host machine to resubmit the outstanding store requests at the destination host machine (e.g., write the outstanding store requests to the page cache of the destination host machine). The outstanding store requests are then canceled at the source host machine and all other page cache entries for the virtualized component at the source host machine are flushed to storage.

Implementations of the disclosure provide a technical improvement over the conventional systems by reducing and/or avoiding altogether the flush operation for page cache entries of a virtualized component at a source host machine. Reducing and/or avoiding the flush operation results in a faster migration process as access to slow networked storage is minimized. Correspondingly, this results in more efficient usage of processing resources and a better overall user experience.

FIG. 1 depicts an illustrative architecture of elements of a virtualization system 100, in accordance with an implementation of the disclosure. It should be noted that other architectures for virtualization system 100 (also referred to herein as system 100) are possible, and that the implementation of a computer system utilizing embodiments of the disclosure are not necessarily limited to the specific architecture depicted by FIG. 1.

As shown in FIG. 1, system 100 comprises computer systems, including source host machine 101-1 and destination host machine 101-2, connected via a network 150. Each of host machines 101-1 and 101-2 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable page cache management during migration. The network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host machines 101-1 and 101-2 may belong to a cluster comprising additional computer systems not depicted in FIG. 1, while in some other implementations, host machines 101-1 and 101-2 may be independent systems that are capable of communicating via network 150.

Each of host machines 101-1 and 101-2 comprises a central processing unit (CPU) 160-1, 160-2, a memory 170-1, 170-2, which may include volatile memory devices (e.g., random access memory (RAM)), non-volatile memory devices (e.g., flash memory), and/or other types of memory devices, and a storage device 180-1, 180-2 (e.g., a magnetic hard disk, a Universal Serial Bus (USB) solid state drive, a Redundant Array of Independent Disks (RAID) system, a network attached storage (NAS) array, etc.). It should be noted that the fact that a single CPU is depicted in FIG. 1 for each of host machines 101-1 and 101-2 is merely illustrative, and that in some other examples one or both of host machines 101-1 and 101-2 may comprise a plurality of CPUs. Similarly, in some other examples one or both of host machines 101-1 and 101-2 may comprise a plurality of storage devices, rather than a single storage device.

Source host machine 101-1 runs a host operating system (OS) 120-1 that manages the hardware resources of the computer system and that provides functions such as interprocess communication, scheduling, virtual memory management, and so forth. In one example, host operating system 120-1 also comprises a virtualization engine 125-1. Virtualization engine 125-1 may provide a virtual operating platform for virtualized component 130-1, 130-2 (collectively referred to herein as virtualized component 130) and that manages its execution. Virtualized component 130 may be accessed by one or more clients 140 over network 150. In some implementations, clients 140 may be hosted directly by source host machine 101-1 as local clients.

In some implementations, virtualization engine 125-1 may be external to host OS 120-1, rather than embedded within host OS 120-1. For simplicity and ease of explanation, a single virtualized component 130 is depicted in FIG. 1. However, in some implementations, source host machine 101-1 may host a plurality of virtualized components 130.

Virtualization engine 125-1 may include, but is not limited to, a hypervisor or a container engine (such as Docker™engine, etc.). When virtualization engine 125-1 is implemented as a hypervisor, it can provide a virtual operating platform for the virtualized component 130 that is implemented as a virtual machine (VM) (referred to herein as a VM virtualized component 130). A hypervisor can emulate the underlying hardware platform (e.g., CPU 160-1, memory 170-1, storage device 180-1, etc.) of the source host machine 101-1 for the VM virtualized component 130. A hypervisor may also be referred to as a virtual machine monitor (VMM), a kernel-based hypervisor, or a host operating system. A VM virtualized component 130 is a software implementation of a machine that is hosted by source host machine 101-1 and that executes programs as though it were an actual physical machine. In some embodiments, these programs may include one or more guest applications and a guest operating system (OS) that manages resources and provides functions such as interprocess communication, scheduling, memory management, and so forth. VM virtualized component 130 may provide a virtual desktop for the client 140.

When virtualization engine 125-1 is implemented as a container engine, it can provide a virtual operating platform for the virtualized component 130 that is implemented as a container (referred to herein as a container virtualized component 130). A container virtualized component 130 implements a form of operating system virtualization that encapsulates an application's code, configuration, and dependencies into building blocks that can be easily deployed. Container virtualized components 130 allow for the execution of the application and its dependencies in resource-isolated processes (e.g., isolated user-space instances of the host OS 120-1).

When virtualized component 130 is implemented as a container, the virtualization engine 125-1 is installed as a container layer on top of the host OS 120-1. Container instances (i.e., virtualized component 130) can then be provisioned, via the container layer, from the source host machine's 101-1 available resources (e.g., CPU 160-1, memory 170-1, storage 180-1, etc.). Applications can then be deployed within the container virtualized components 130. The container virtualized component 130 is implemented on top of the host OS 120-1, while sharing the host OS 120-1 kernel and, in some cases, the binaries and libraries, with other container virtualized components 130. Shared components may be read-only, with each container able to be written to through a unique mount.

The isolated nature of virtualized component 130 makes it easy to move between environments (e.g., development, test, production, etc.), while retaining full functionality. For example, an application can be migrated from the source host machine 101-1 to the destination host machine 101-2 by migrating the virtualized component 130 that deploys the application. Migration of virtualized component 130 involves saving the state of the virtualized component 130 on source host machine 101-1 and restoring it on destination host machine 101-2.

In accordance with one example, virtualization engine 125-1 may include a migration manager 128-1 that is capable of page cache management during a migration process of the virtualized component 130. For purposes of the below description, virtualized component 130 is migrated from source host machine 101-1 to destination host machine 101-2 during a migration process. As part of the migration process for the virtualized component 130, the state of the virtualized component 130 at the source host machine 101-1 is saved (checkpointed) and restored at the destination host machine 101-2 One portion of the virtualized component 130 state may be data stored on disk. Disk may refer to a local storage device 180-1 and/or a shared storage device 190. Shared storage device 190 may be accessible by more than one host machine 101-1, 101-2 over network 150. Shared storage device 190 may include, but is not limited to, a magnetic hard disk, a USB solid state drive, a RAID system, a NAS array, etc.

As storage to disk can often be a time-consuming process, the virtualized component 130 state data that is to be written to disk may be stored in a page cache 175-1 prior to being written to disk. A page cache (also referred to as a disk cache) refers to a hardware or software (instructions implemented by hardware) component that stores data as an interim location on the way to secondary storage (such as storage device 180-1, shared storage device 190), so that future requests for that data can be served faster. The host OS 101-1 may maintain the page cache 175-1 in otherwise unused portions of memory 170-1, resulting in quicker access to the contents of the cached pages (contiguous blocks of virtual memory) and overall performance improvements. A page cache can be implemented in kernels with paging memory management, and is transparent to applications.

When a migration process for the virtualized component 130 is initiated (e.g., by a migration manager 115 of a host controller 110, by host machines 101-1, 101-2, etc.), the migration manager 128-1 stops execution of the virtualized component 130. After the virtualized component 130 is stopped, a page cache manager 129-1 of the migration manager 128-1 retrieves a list of store requests (e.g., write requests) submitted by the virtualized component 130 and still outstanding (i.e., dirty) in the page cache 175-1. Instead of flushing (i.e., writing the store requests in the page cache 175-1 out to storage 180, 190 and clearing the corresponding entry in the page cache 175-1) these outstanding store requests to storage (as was done by conventional systems), the store requests and their corresponding data are sent to the destination host machine 101-2 as part of the migration process.

In one implementation, the page cache manager 129-1 obtains a list of outstanding store requests corresponding to the virtualized component 130 in the page cache 175-1. In addition, the page cache manager 129-1 obtains the data corresponding to the outstanding store requests in the list. In one implementation, the page cache 175-1 may include a bit or a flag that indicates that an associated entry is outstanding (e.g., dirty) and has not yet been written out to disk. The list of outstanding store requests may include those requests that are not shared with other virtualized components 130 on the source host machine 101-1. In other words, if a store request associated with the virtualized component 130 in the page cache 175-1 is indicated as shared with processes other than the virtualized component 130 (e.g., a flag or other marker in the page cache 175-1 may provide this indication), then this store request is not included in the list of outstanding store requests obtained by the page cache manager 129-1. In one implementation, a shared resource may refer to a memory page that is accessible and/or utilized by a plurality of virtualized components 130 hosted on the source host machine 101-1.

Figure 2:
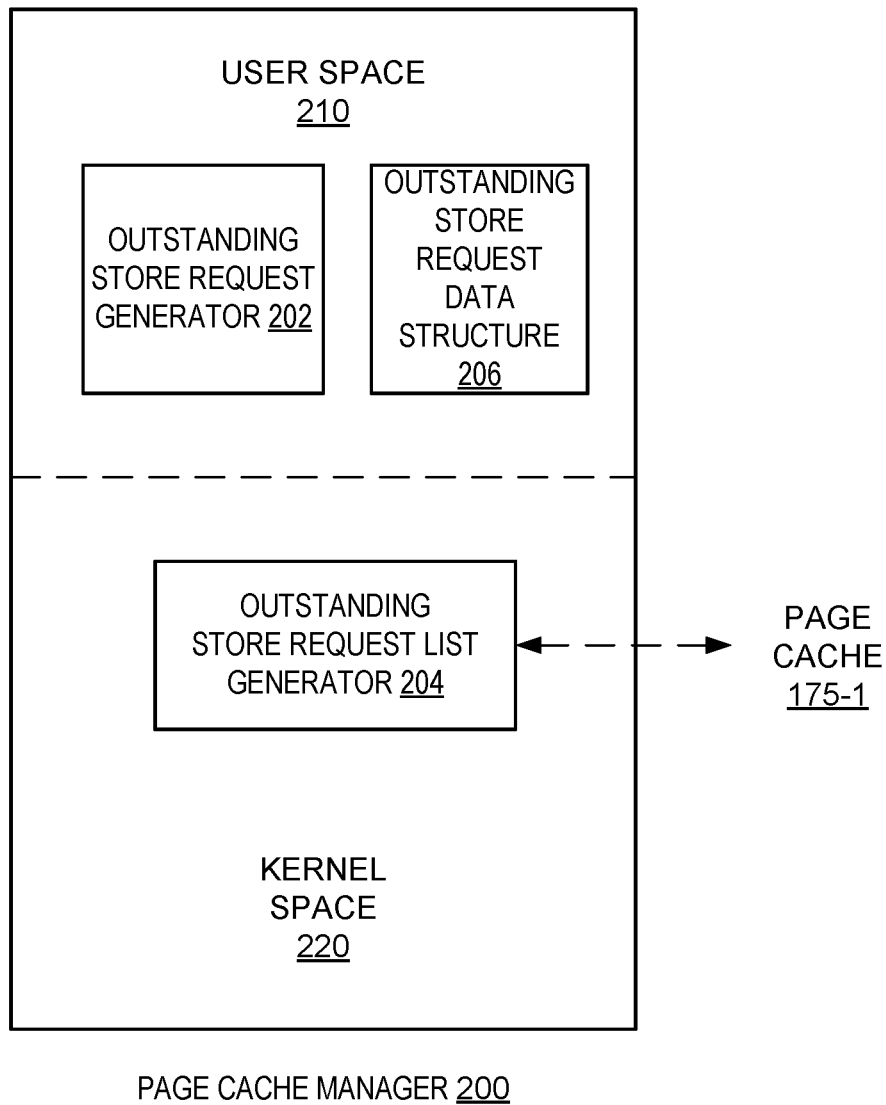
FIG. 2 is a block diagram illustrating a page cache manager as a module component having user space and kernel space portions, according to an implementation of the disclosure.

In one implementation, the page cache manager 129-1 may be implemented as a modular component of the virtualization engine 125-1. As a modular process, the page cache manager may include a user space portion and a kernel space portion. FIG. 2 is a block diagram illustrating a page cache manager 200 as a modular component having user space and kernel space portions. Page cache manager 200 may be the same as page cache manager 129-1 described with respect to FIG. 1. In one example, page cache manager 200 may be implemented when virtualized component 130 of FIG. 1 is a container virtualized component 130.

Page cache manager 200 may include a user space 210 portion and a kernel space 220 portion. In one implementation, user space 210 portion of page cache manager 200 may include the processes and/or component of page cache manager 200 that execute in a user space of the host OS (e.g., host OS 120-1 of FIG. 1). In one implementation, kernel space 220 portion of page cache manager 200 may include the processes and/or components of page cache manager 200 that execute in a kernel space of the host OS (e.g., host OS 120-1 of FIG. 1). These processes and/or components may include, but are not limited to, outstanding store request generator 202, outstanding store request list generator 204, and outstanding store request data structure 206.

User space 210 portion of page cache manager 200 may include an outstanding store request generator 202. The outstanding store request generator 202 can generate a request for all store requests corresponding to the virtualized component 130 in the page cache 175-1 and still outstanding (i.e., not written out to disk, dirty, etc.) in the page cache 175-1. In one example, for a container virtualized component 130, the outstanding store request generator 202 may generate a request for outstanding write requests for a block input/output (I/O) (blkio) container group of the container virtualized component 130. The outstanding store request generator 202 may transmit this generated request to the kernel space 220 portion of the page cache manager 200.

The kernel space 220 portion of the page cache manager 200 may include an outstanding store request list generator 204. The outstanding store request list generator 204 may have access to the page cache 175-1 of the source host machine 101-1. The outstanding store request list generator 204 may access the page cache 175-1 to identify those page cache entries corresponding to the virtualized component 130 that are still outstanding (e.g., dirty entry in page cache 175-1). As discussed above, the outstanding store request list generator 204 may also identify, from among the still outstanding page cache entries of the virtualized component 130, those page cache entries that are not shared with any other virtualized components 130 or other components of the source host machine 101-1. The outstanding store request list generator 204 then populates a list with the identified page cache entries and provides this list to the user space 210 portion of page cache manager 200.

The user space 210 portion of page manager may use this list to obtain data associated with the outstanding store requests of the list. This data may refer to the contents of the pages to be written to the storage location identified by each of the page cache entries of the list. In one implementation, the outstanding store request generator 202 may separately request the data from the kernel space 220 portion of the page cache manager. In other implementations, the outstanding store request generator 202 may include the request for data as part of the original request for the list. When the requested data is received from the kernel space 220 portion of the page cache manager 200, the data may be stored in outstanding store request data structure 206 (e.g., a buffer) of the user space 210 portion of page cache manager 200. The list and the data may then be transmitted by page cache manager 200 to the destination host machine 101-2 as part of the migration process.

In some implementations, the user space 210 portion of page cache manager 200 may maintain a mapping (e.g., in outstanding store request data structure 206) of the page cache entries corresponding to the virtualized component 130. This mapping may include pointers to the page cache entries maintained in page cache 175-1 that correspond to the virtualized component 130. The outstanding store request generator 202 may utilize this mapping to identify the page cache entries that correspond to outstanding (and, in some cases, non-shared) store requests of the virtualized component 130. The outstanding store request generator 202 may then provide pointers corresponding to the identified page cache entries in the mapping to the kernel space 220 component along with instructions to transmit the respective page cache entries and corresponding data from the page cache 175-1 to the destination host machine 101-2.

Referring back to FIG. 1, destination host machine 101-2, like source host machine 101-1, runs a host OS 120-2 that manages the hardware resources of the destination host machine 101-2 and that provides functions such as interprocess communication, scheduling, virtual memory management, and so forth. In one example, host OS 120-2 comprises a virtualization engine 125-2 that manages virtualized components (such as VMs or containers). It should be noted that in some alternative examples, virtualization engine 125-2 may be external to host OS 120-2, rather than embedded within host OS 120-2.

In accordance with one example, virtualization engine 125-2, like virtualization engine 125-1 of computer system 101-1, includes a migration manager 128-2 that, like migration manager 128-1, is capable of page cache management during migration. The migration manager 128-2 manages the migration process of the virtualized component 130-1 at destination host machine 101-2, where virtualized component 130-1 is resumed as virtualized component 130-2. Specifically, the migration manager 128-2 can receive and process the list (and corresponding data) of outstanding store requests sent from source host machine 101-1. The page cache manager 129-2 of migration manger 128-2 causes the outstanding store requests to be submitted at the destination host machine 101-2. Submission of the store requests includes resubmitting the store requests for writing to storage (e.g., storage device 180-2, shared storage device 190) at the destination host machine 101-2. As a result of memory management processes at the destination host machine 101-2, the store requests are rewritten to page cache 175-2 at the destination host machine 101-2.

In one implementation, if the page cache manager 129-2 at the destination host machine 101-2 encounters a problem or error when resubmitting the outstanding store requests at the destination host machine 101-2, the migration manager 128-2 can notify the migration manager 128-1 of the source host machine 101-1 of the occurrence of this problem or error. The migration manager 128-1 of the source host machine 101-1 can then cause the migration process to abort. As the page cache 175-1 at the source host machine 101-1 remains in its pre-migration state, the virtualized component 130-1 can resume execution at the source host machine 101-1 without any loss of data, or the migration process can be re-tried with the destination host machine 101-2 or another host machine (not shown).

Subsequent to the migration manager 128-2 successfully resubmitting the received store requests corresponding to the virtualized component 130, the migration manager 128-2 may transmit a confirmation to the source host machine 101-1 indicating that the resubmission of the outstanding store requests of the list was successful. Once the migration manager 128-1 of the source host machine 101-1 receives this confirmation, it can instruct the page cache manager 129-1 to cancel the outstanding store requests from the list in the page cache 175-1, and clear (e.g., flush; write each entry to storage and mark entry as clean in page cache 175-1) any remaining entries (e.g., shared entries, etc.) in the page cache 175-1 corresponding to the virtualized component 130.

In one implementation, there may be outstanding store requests at the source host machine 101-1 that have not yet been written into the page cache 175-1. As part of the migration process, the migration manager 128-1 and/or page cache manager 129-1 of the source host machine 101-1 may retrieve such outstanding requests from the virtualized component 130 and handle the requests in the same manner as described above (i.e., cancel the requests and restart on the destination host machine 101-2).

Once the page cache manager 129-1 indicates successful completion of the cancel and clear operations, the migration manager 128-1 can send an acknowledgment to the migration manager 128-2 of the destination host machine 101-2 that the source host machine 101-1 page cache 175-1 is clean. The migration manager 128-2 may then proceed with any remaining tasks of the migration process in order to resume the virtualized component 130-2 on the destination host machine 101-2.

Figure 3:
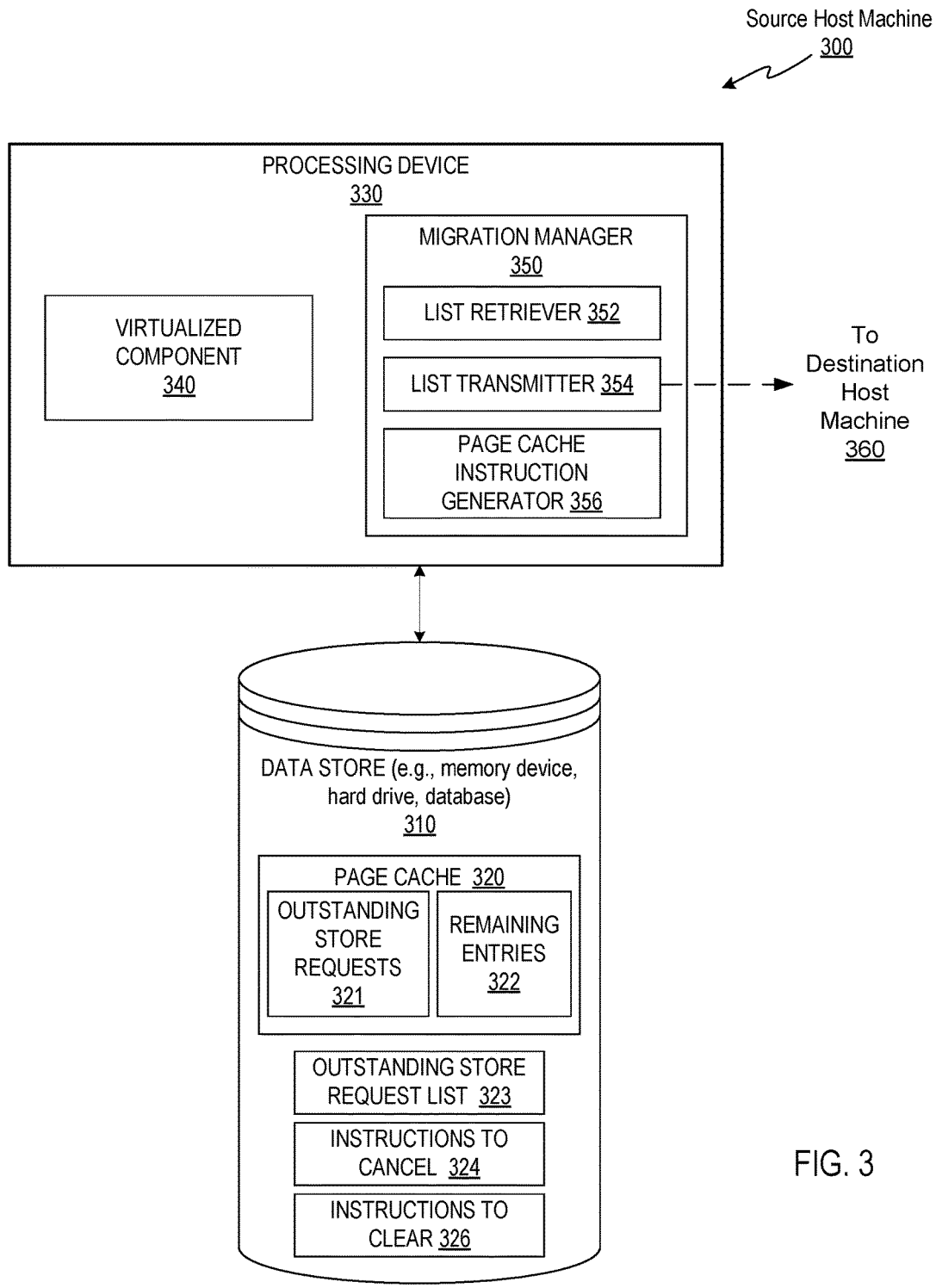
FIG. 3 schematically illustrates an example host source machine apparatus in which implementations of the disclosure may operate.

FIG. 3 illustrates an example source host machine 300 in which implementations of the disclosure may operate. The source host machine 300 may be the same or similar to one of the source host machine 101-1 within the virtualization system 100 described with respect to FIG. 1. Source host machine 300 may include components and modules for page cache management during migration. The source host machine 300 may include a data store 310 that can store a page cache 320 (with outstanding store requests 321 and remaining entries 322), an outstanding store requests list 323, instructions to cancel 324, and instructions to clear 326. The data store 310 may include any non-persistent data storage (e.g., memory), persistent data storage (e.g., flash storage, hard drive, tape), other medium, or combination thereof that is capable of storing instructions for carrying out the operations of the components and modules discussed herein.

The source host machine 300 may include a processing device 330 with a virtualized component 340 and a migration manager 350. The migration manager may include a list retriever 352, a list transmitter 354, and a page cache instruction generator 356. The migration manager 350 may initiate a migration process for migration of a virtualized component 340 from a source host machine 300 to a destination host machine 360. The list retriever 352 may obtain a list 323 of outstanding store requests 321 corresponding to the virtualized component 340. The outstanding store requests 321 of the list 323 may be maintained in a page cache 320 of the source host machine 300. The list transmitter 354 may transmit the list 323 to the destination host machine 360. The page cache instruction generator 356 may provide instructions to cancel 324 the outstanding store requests 321 of the list 323 in the page cache 320 at the source host machine 300. The page cache instruction generator 356 may also provide instructions to clear 326 remaining entries 322 associated with the virtualized component 340 in the page cache 320 of the source host machine 300.

Figure 4:
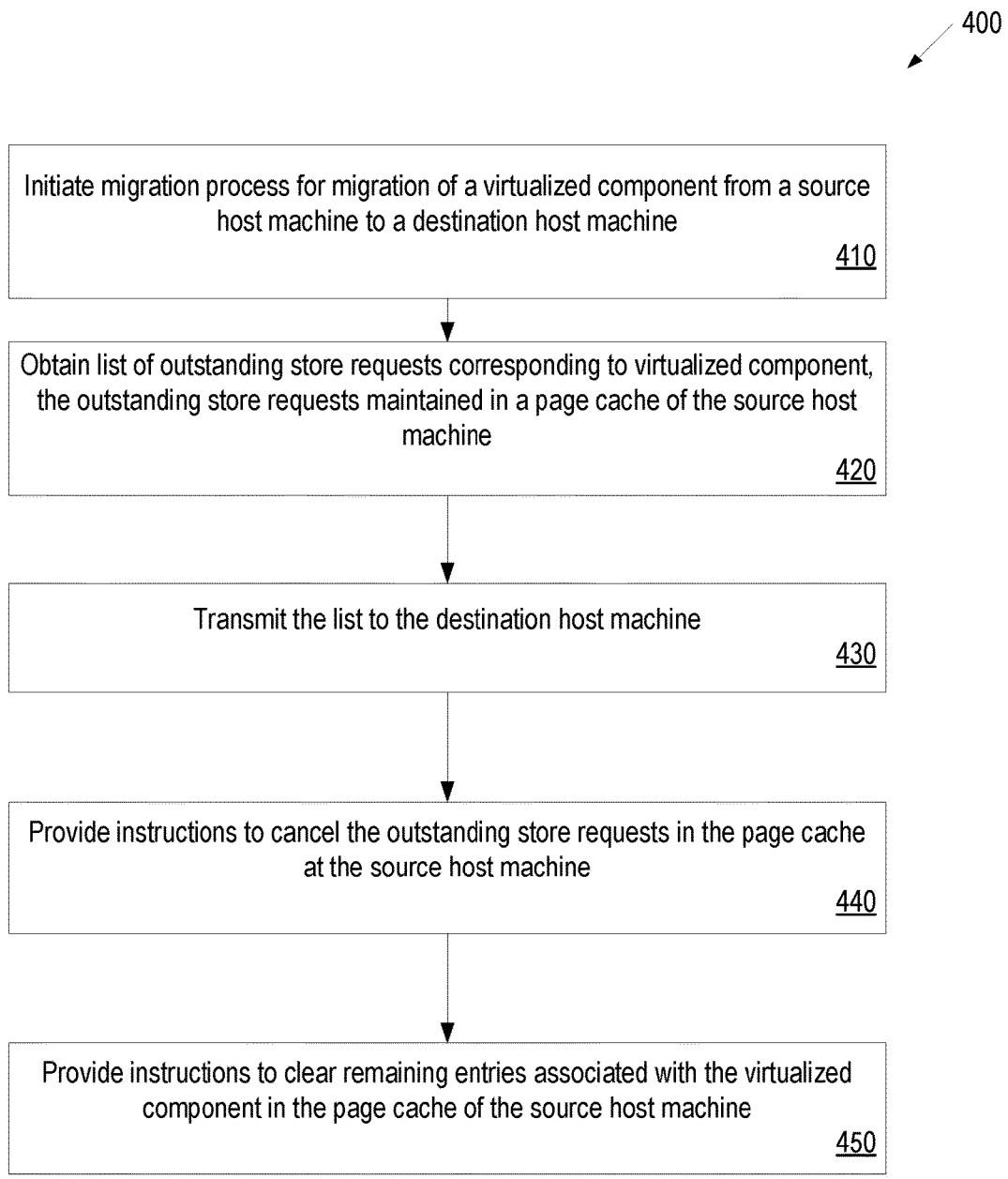
FIG. 4 depicts a flow diagram of a method of page cache management during migration at a source host machine, in accordance with one or more aspects of the disclosure.
Figure 5:
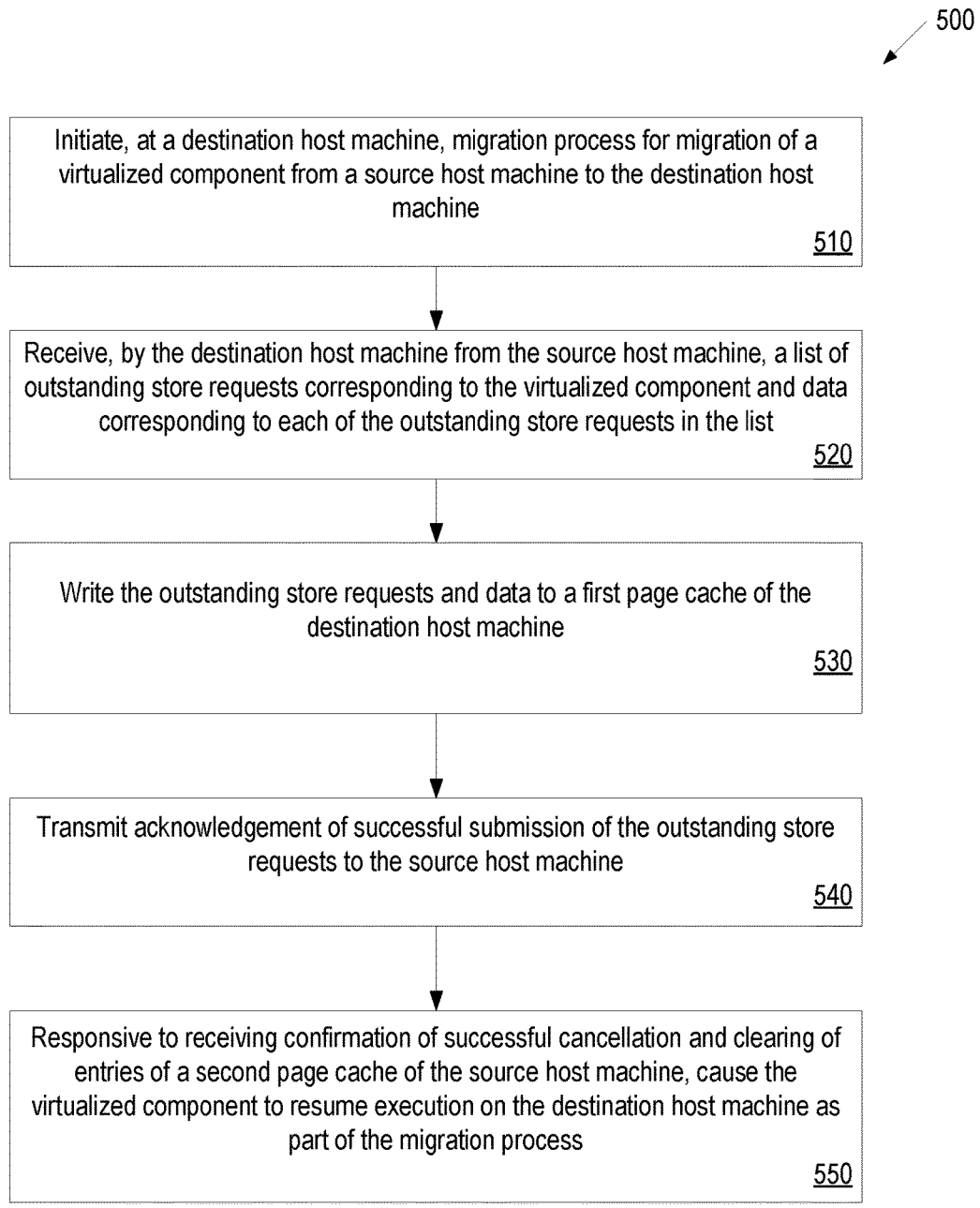

FIGS. 4 and 5 depict flow diagrams for illustrative examples of methods 400 and 500 for page cache management during migration. Method 400 includes a method of page cache management during migration at a source host machine. Method 500 includes a method of page cache management during migration at a destination host machine. Methods 400 and 500 may be performed by processing devices that may comprise hardware (e.g., circuitry, dedicated logic), computer readable instructions (e.g., run on a general purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 400 and 500 may be performed by a host machine, specifically migration manager 128 or source host machine 101-1 or destination host machine 101-2, as shown in FIG. 1.

Referring to FIG. 4, method 400 may be performed by processing devices of a computing device and may begin at block 410. At block 410, a processing device may initiate a migration process for migration of a virtualized component from a source host machine to a destination host machine. At block 420, the processing device may obtain a list of outstanding store requests corresponding to the virtualized component. In one implementation, the outstanding store requests are maintained in a page cache of the source host machine.

Subsequently, at block 430, the processing device may transmit the list to the destination host machine. At block 440, the processing device may provide instructions to cancel the outstanding store requests in the page cache at the source host machine. Lastly, at block 450, the processing device may provide instructions to clear remaining entries associated with the virtualized component in the page cache of the source host machine.

Referring to FIG. 5, method 500 may be performed by processing devices of a computing device and may begin at block 510. At block 510, a processing device may initiate a migration process for migration of a virtualized component from a source host machine to the destination host machine. At block 520, the processing device may receive, from the source host machine, a list of outstanding store requests corresponding to the virtualized component and data corresponding to each of the outstanding store requests in the list. Subsequently, at block 530, the processing device may write the outstanding store requests and data to a first page cache of the destination host machine. At block 540, the processing device may transmit, to the source host machine, an acknowledgement of successful submission of the outstanding store requests. Lastly, at block 550, the processing device may, responsive to receiving confirmation of successful cancellation and clearing of entries of a second page cache of the source host machine, cause the virtualized component to resume execution on the destination host machine as part of the migration process.

Figure 6:
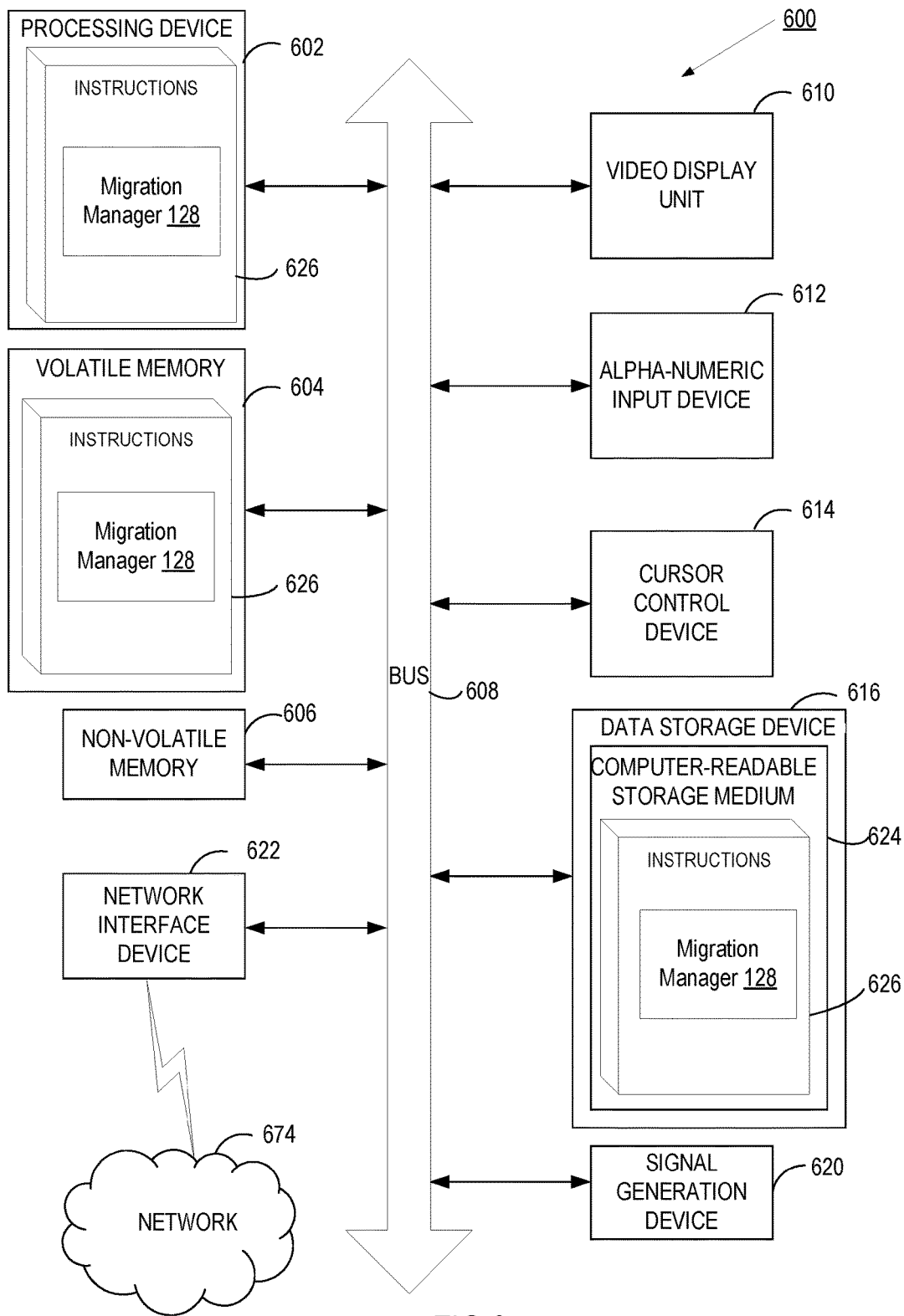

FIG. 6 depicts a block diagram of a computer system operating in accordance with one or more aspects of the disclosure. In various illustrative examples, computer system 600 may correspond to a computing device, such as migration manager 128-1, 128-2 within host machine 101-1, 101-2 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622 coupled to network 674. Computer system 600 also may include a video display unit 610 (e.g., a liquid crystal display (LCD)), an alphanumeric input device 612 (e.g., a keyboard), a cursor control device 614 (e.g., a mouse), and a signal generation device 620.

Data storage device 616 may include a non-transitory computer-readable storage medium 624 which may store instructions 626 encoding any one or more of the methods or functions described herein, including instructions for a migration manager 128 (e.g., 128-1 or 128-2) of FIG. 1 for implementing methods 400 and 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as application specific integrated circuit (ASICs) field programmable gate arrays (FPGAs), digital signal processors (DSPs) or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulate and transform data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:

initiating, by a processing device of a source host machine, a migration process for migration of a virtualized component from the source host machine to a destination host machine;

obtaining a list of outstanding store requests corresponding to the virtualized component, the outstanding store requests maintained in a page cache of the source host machine, the obtaining comprising;

generating, by a user space component of an operating system (OS) of the source host machine, a request for the list of outstanding store requests corresponding to the virtualized component, the user space component associated with a virtualization engine executed by the processing device; and transmitting the generated request from the user space component to a kernel space component of the virtualization engine, the kernel space component to access the page cache and to generate the list in view of the access;

transmitting the list to the destination host machine;

providing, by the processing device, instructions to cancel the outstanding store requests in the page cache of the source host machine; and providing instructions to clear remaining entries associated with the virtualized component in the page cache of the source host machine.

2. The method of claim 1, wherein the virtualized component comprises at least one of a virtual machine or a container.

3. The method of claim 1, further comprising:
obtaining data corresponding to the outstanding store requests; and
transmitting the data to the destination host machine.

4. The method of claim 1, further comprising receiving confirmation of resubmission of the outstanding store requests at the destination host machine, wherein providing the instructions to cancel and providing the instructions to clear are responsive to the receiving of the confirmation of resubmission.

5. The method of claim 1, wherein the instructions to cancel and the instructions to clear are provided as part of obtaining the list.

6. The method of claim 1, wherein the outstanding store requests correspond to non-shared store requests for non-shared resources of the virtualized component on the source host machine, the resources comprising at least a memory page.

7. The method of claim 1, wherein the virtualization engine comprises at least one of a hypervisor or a container engine.

8. The method of claim 1, further comprising transmitting, to the destination host machine, an acknowledgment that the outstanding store requests have been canceled and the remaining entries associated with the virtualized component in the page cache have been cleared, wherein the acknowledgement allows the virtualized component to resume on the destination host machine as part of the migration process.

9. A source host machine comprising,
a memory; and
a processing device operatively coupled to the memory, wherein the processing device is operable to:
initiate a migration process for migration of a virtualized component from the source host machine to a destination host machine;
obtain a list of outstanding store requests corresponding to the virtualized component, the outstanding store requests maintained in a page cache of the source host machine, wherein the processing device, to obtain the list, is operable to:
generate, by a user space component of an operating system (OS) of the source host machine, a request for the list of outstanding store requests corresponding to the virtualized component, the user space component associated with a virtualization engine executed by the processing device; and
transmit the generated request from the user space component to a kernel space component of the virtualization engine, the kernel space component to access the page cache and to generate the list in view of the access;
transmit the list to the destination host machine;
provide instructions to cancel the outstanding store requests in the page cache of the source host machine; and
provide instructions to clear remaining entries associated with the virtualized component in the page cache of the source host machine.

10. The source host machine of claim 9, wherein the virtualized component comprises at least one of a virtual machine or a container.

11. The source host machine of claim 9, wherein the processing device is further operable to:
obtain data corresponding to the outstanding store requests; and
transmit the data to the destination host machine.

12. The source host machine of claim 9, wherein the processing device is further operable to receive confirmation of resubmission of the outstanding store requests at the destination host machine, and wherein the instructions to cancel and the instructions to clear are provided by the processing device responsive to the receiving of the confirmation of the resubmission.

13. The source host machine of claim 9, wherein the outstanding store requests correspond to non-shared store requests for non-shared resources of the virtualized component on the source host machine, the resources comprising at least a memory page.

14. The source host machine of claim 9,
wherein the virtualization engine comprises at least one of a hypervisor or a container engine.

15. The source host machine of claim 9, wherein the processing device is further operable to transmit, to the destination host machine, an acknowledgment that the outstanding store requests have been canceled and the remaining entries associated with the virtualized component in the page cache have been cleared, and wherein the acknowledgement allows the virtualized component to resume on the destination host machine as part of the migration process.

16. A non-transitory machine-readable storage medium storing instructions that cause a processing device to:
initiate, by the processing device, a migration process for migration of a virtualized component from a source host machine to a destination host machine comprising the processing device;
receive, by the destination host machine from the source host machine, a list of outstanding store requests corresponding to the virtualized component and data corresponding to each of the outstanding store requests in the list, the list of outstanding store requests obtained by a user space component of an operating system (OS) of the source host machine by:
generating by the user space component a request for the list of outstanding store requests corresponding to the virtualized component, the user space component associated with a virtualization engine executed by the processing device, the outstanding store requests maintained in a page cache of the source host machine, and
transmitting the generated request from the user space component to a kernel space component of the virtualization engine, the kernel space component to access the page cache and to generate the list in view of the access;
write, by the processing device, the outstanding store requests and data to a first page cache of the destination host machine
transmit, by the processing device to the source host machine, an acknowledgment of successful writing of the outstanding store requests and the data to the first page cache of the destination host machine; and
responsive to receiving a confirmation of successful cancellation and clearing of entries of a second page cache of the source host machine, cause the virtualized component to resume execution on the destination host machine as part of the migration process.

17. The non-transitory machine-readable storage medium of claim 16, wherein the virtualized component comprises at least one of a virtual machine or a container.

18. The non-transitory machine-readable storage medium of claim 16, wherein the outstanding store requests correspond to non-shared store requests for non-shared resources of the virtualized component on the source host machine, the resources comprising at least a memory page.

* * * * *